(No Model.)
J. G. MOOMY & C. WHITEHEAD.
MOLD FOR FORMING TIRE CASINGS.
No. 530,195. Patented Dec. 4, 1894.
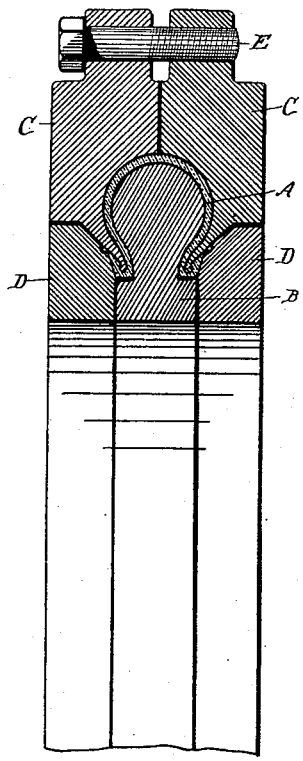
Fig. 1
Fig. 2
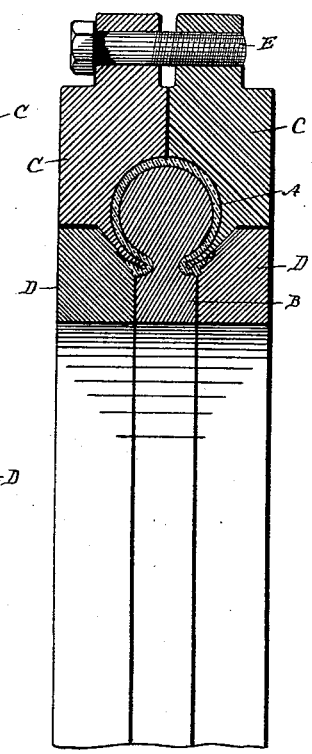
Fig. 6
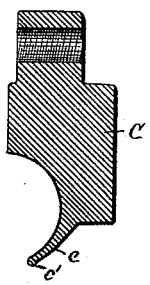
Fig. 7
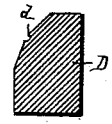
Fig. 3
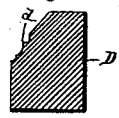
Fig. 8
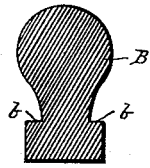
Fig. 4
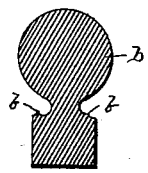
Fig. 9
Fig. 10
Fig. 5
Witnesses
Wm Marks Jr
H C Snow
Inventors.
Joseph G. Moomy
Charles Whitehead
By Attorneys
Hallock & Hallock

UNITED STATES PATENT OFFICE.

JOSEPH G. MOOMY AND CHARLES WHITEHEAD OF ERIE, PENNSYLVANIA.

MOLD FOR FORMING TIRE-CASINGS.

SPECIFICATION forming part of Letters Patent No. 530,195, dated December 4, 1894.

Application filed November 20, 1893. Serial No. 491,478. (No model.)

*To all whom it may concern:*

Be it known that we, JOSEPH G. MOOMY and CHARLES WHITEHEAD, citizens of the United States, residing at Erie, in the county of Erie and State of Pennsylvania, have invented certain new and useful Improvements in Molds for Forming Tire-Casings; and we do hereby declare the following to be a full, clear, and exact description of the invention, such as will enable others skilled in the art to which it appertains to make and use the same.

This invention relates to a mold for molding tire casings, and consists in certain improvements in the construction thereof, as will be hereinafter fully described and pointed out in the claims.

The mold is illustrated in the accompanying drawings as follows:

Figure 1 is a transverse section of the mold, with its parts in place and the casing therein as in process of molding. Figs. 2, 3 and 4 show the parts of the mold disconnected. Fig. 5 is a transverse section of the casing, showing its shape as it comes from the mold. Fig. 6 is a like view to Fig. 1, but showing a casing having flaps of a modified shape from that shown in Fig. 1. Figs. 7, 8 and 9 show the disconnected parts of said mold. Fig. 10 shows a transverse section of a casing as it comes from the mold shown in Fig. 6.

Tire casings have heretofore been molded with outwardly turned binder flaps; but so far as we are aware, no binder flaps have been molded that normally turn back outside the binder in close proximity to the casing. Flaps have been made to assume this position, when in place on the rim, either by the shape of the rim or the method of binding; but this construction does not permit of the use of as stiff flaps as is possible where the flap assumes this position normally, and the natural elasticity of the flap, instead of having a tendency to hold the binder in place, gives the flap a tendency to roll out from under the binder.

To form a tire casing having binder flaps which are properly shaped, and normally turn back outside the binder in close proximity to the casing is the object of our invention. In accomplishing this result we employ the following method.

We place the properly prepared material for the tire casing, A, over the core, B, the material having sufficient width to extend far enough by the shoulders, $b\ b$, to form the binder flaps. The casing forming rings, C C, are then placed over the material and clamped, preferably with bolts, E, at intervals along the outer circumference. These rings are cut away on their inner edges making a passage forming annulus, $c$, of only sufficient thickness to make a passage, $a$, between the flap and the casing just wide enough for convenient access to the binder recess, $a'$. On the inner edge of the passage forming annulus is the recess forming rib, $c'$, for forming the binder recess. As the casing forming rings are clamped the material is forced into the grooves formed by the shoulders, $b\ b$, and the shoulders, $b\ b$, form the inner edges of the casing or the bottom of the flaps. The material is then folded back upon the passage forming annuli, and the flap forming rings, D D, put in place over the flaps, and then the whole mold is put in the press. Just above where the edge of the flap should come on the flap forming ring, we place an overflow recess, $d$, into which the surplus material, if any, passes when the mold is subjected to the press, thus allowing the mold to be properly brought together. This overflow also distinctly marks the proper edge of the flap. After the material is properly vulcanized, the flap forming rings are removed; then the casing forming rings; and then the casing is sprung over the core. If the flaps are too stiff to allow the casing to be sprung over the core, the core may be made in segments.

It will be readily seen that with the mold and this process a casing having flaps of any desired stiffness may be molded that will normally assume the proper position for use.

Figs. 1 and 6 show molds for casings with flaps of different contour, but in both cases the parts of the mold perform the same functions in the same way and are marked with the same letters.

What we claim as new is—

1. In a mold for forming tire casings, the combination of the core; the casing forming ring having a passage forming annulus thereon over which the binder flap is turned in molding; and a binder flap forming ring for holding said flap in place and forming its outside.

2. In a mold for forming tire casings, the combination of the core; the casing forming ring having a passage forming annulus thereon on which is a recess forming rib, and over which the binder flap is folded in molding; and a binder flap forming ring that holds said flap in place and forms its outside.

3. In a mold for forming tire casings, the combination of the core; the casing forming ring having a passage forming annulus thereon over which the flap is turned in molding; and a flap forming ring for holding said flap in place and forming its outside; said casing forming and said flap forming ring having an overflow recess between them for the purposes set forth.

In testimony whereof we affix our signatures in presence of two witnesses.

JOSEPH G. MOOMY.
CHARLES WHITEHEAD.

Witnesses:
H. C. LORD,
J. P. SLOCUM.